United States Patent [19]

Shibasaki

[11] 4,455,099
[45] Jun. 19, 1984

[54] BEARING LUBRICATING SYSTEM FOR ELECTRIC ROTARY MACHINE

[75] Inventor: Kazunori Shibasaki, Kobe, Japan

[73] Assignee: Mitsubishi Denki Kabushiki Kaisha, Tokyo, Japan

[21] Appl. No.: 435,392

[22] Filed: Oct. 19, 1982

[30] Foreign Application Priority Data

Oct. 20, 1981 [JP] Japan ............... 56-169055

[51] Int. Cl.³ ............................ F16C 33/10
[52] U.S. Cl. ................... 384/316; 308/187
[58] Field of Search ........... 384/316, 313, 398, 415, 384/400, 373; 308/229, 230, 231, 187

[56] References Cited

U.S. PATENT DOCUMENTS

| | | | |
|---|---|---|---|
| 2,709,567 | 5/1955 | Wood | 384/316 |
| 3,031,973 | 5/1962 | Krämer | 384/316 |
| 3,786,901 | 1/1974 | Randell | 384/415 |
| 4,397,571 | 8/1983 | Morrill | 384/398 |

*Primary Examiner*—Lenard A. Footland
*Attorney, Agent, or Firm*—Wenderoth, Lind & Ponack

[57] ABSTRACT

For a vertical shaft electric rotary machine comprising a pair of upper and lower vertical shafts extending from a rotor and rotatably supported by a bearing within an upper oil tank and a bearing unit within a lower oil tank respectively, a disclosed bearing lubricating system comprises an amount of a lubricating oil charged into each of the oil tanks, centrifugal pump means per se known and disposed around the bearing unit to pump the lubricating oil to an external oil cooler, an annular tub disposed below the centrifugal pump means to receive the lubricating oil from the oil cooler, a supply pipe with a flow rate control valve connected between the oil cooler and the upper oil tank and a return pipe connected between the upper and lower oil tanks.

5 Claims, 2 Drawing Figures

BEARING LUBRICATING SYSTEM FOR ELECTRIC ROTARY MACHINE

BACKGROUND OF THE INVENTION

This invention relates to a bearing lubricating system for a vertical shaft electric rotary machine in which centrifugal pump means is disposed around a vertical shaft thereof to pump a lubricating oil adjacent to associated bearing unit to an external oil cooler and return the lubricating oil cooled by the oil cooler back to the bearing unit, thereby to lubricate the bearing unit.

A vertical shaft electric rotary machine of the known type has comprised a pair of upper and lower shafts extending in vertically aligned relationship and in the opposite directions from a rotor, an upper guide bearing disposed in an upper oil tank fitted into an upper bracket to rotatably support the upper shaft, and a frange unit integral with the lower shaft to include a pendent cylindrical portion coaxial with the lower shaft. Then a lower guide bearing radially supports the periphery of the frange unit and a thrust bearing support the lower end of the cylindrical portion to rotatably support a frange unit and the lower shaft. The two bearing are disposed in, a lower oil tank subsequently located within a lower bracket.

A conventional bearing lubricating system of the type referred to has comprised an amount of a lubricating oil charged in each of the upper and lower oil tanks, and centrifugal pump means including a plurality of force delivery holes radially extending through the pendent cylindrical portion of the frange unit and an enclosure for enclosing the outlet side of the force delivery holes with an annular gap formed between the bottom thereof and an adjacent part of the pendent cylindrical portion to permit the passage of the lubricating oil therethrough. The centrifugal pump means is operated to pump the lubricating oil having lubricated the bearings to increase in temperature to an external oil cooler where the oil is cooled by a cooling coil having cooling water flowing therethrough. The cooled lubricating oil is returned back to the lower tank to again lubricate the bearings after which the process as described above is repeated.

On the other hand, the lubricating oil within the upper oil tank lubricates the upper guide bearing to increase in temperature. The lubricating oil increased in temperature is cooled by an oil cooler in the form of a cooling coil disposed within the upper oil tank through which cooling water is flowing.

In conventional bearing lubricating systems such as described above, the upper oil tank has been large-scaled because of the presence of the oil cooler and also it has been required to flow the oil cooler with cooling water through a piping therefor. The use of such a piping has made the maintenance of the conventional systems troublesome. For example, it has been required to always take precaution against any leakage of water through the connection of the oil cooler to the piping.

Accordingly it is an object of the present invention to provide a new and improved bearing lubricating system for a vertical shaft electric rotary machine simplified in construction and eliminating the maintenance concerning leakages of water.

SUMMARY OF THE INVENTION

The present invention provides a bearing lubricating system for a vertical shaft electric rotary machine comprising a rotor, a pair of upper and lower shafts extending in vertically aligned relationship and in the opposite directions from the rotor, upper bearing means for rotatably supporting the upper shaft, lower bearing means for rotatably supporting the lower shaft, an upper oil tank charged with an amount of a lubricating oil and accommodating the upper bearing means therein, and a lower oil tank charged with an amount of the lubricating oil and accommodating the lower bearing means therein.

The bearing lubricating system comprises centrifugal pump means per se known and disposed in the lower oil tank to pump the lubricating oil externally of the lower oil tank, an oil cooler disposed outside of the lower oil tank to receive the lubricating oil externally pumped by the centrifugal pump means to cool the received lubricating means, first oil piping means for returning the lubricating oil within the oil cooler back to the lower oil tank, and second oil piping means for supplying the lubricating oil in the oil cooler to the upper oil tank, and returning the lubricating oil in the upper oil tank to the lower oil tank.

In a preferred embodiment of the present invention the bearing lubricating system may includes an overflow tub disposed below the centrifugal pump means to enclose the lower portion of the lower bearing means, and connected to the first oil piping means, and a control valve connected in the second oil piping means to control a flow rate of the lubricating oil supplied to the upper oil tank.

BRIEF DESCRIPTION OF THE DRAWING

The present invention will become more readily apparent from the following detailed description taken in conjunction with the accompanying drawing in which.

DESCRIPTION OF THE PREFERRED EMBODIMENTS

Figure 1:
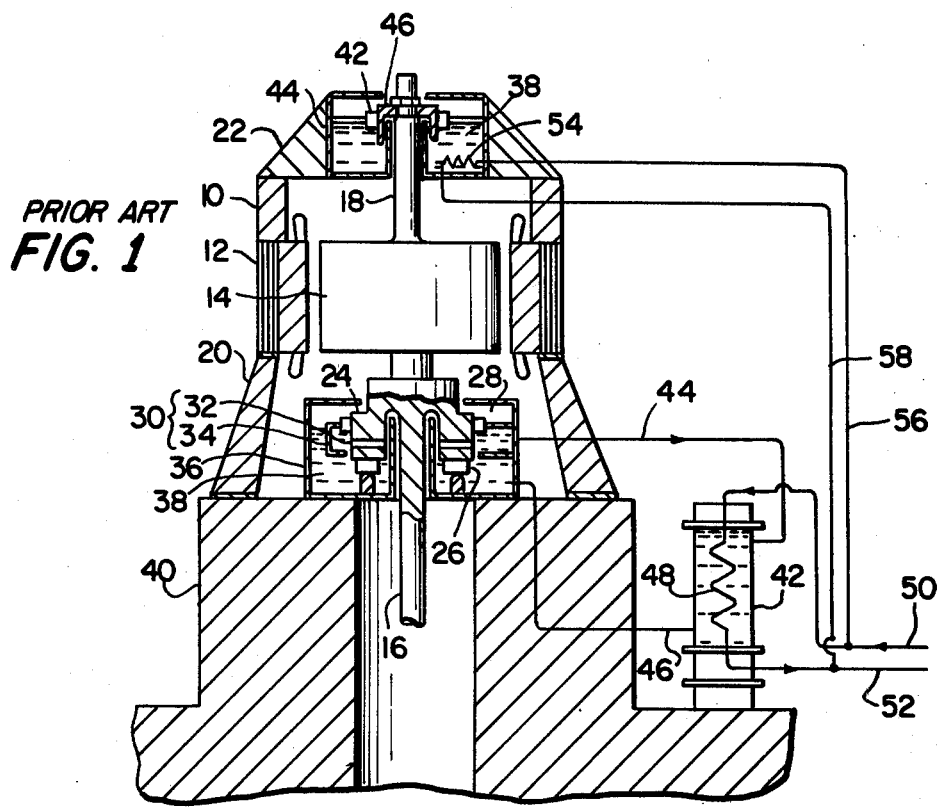
FIG. 1 is a fragmental longitudinal sectional view of a conventional bearing lubricating system for a vertical shaft electric rotary machine with parts illustrated in elevation.

Referring now to FIG. 1 of the drawing, there is illustrated a conventional bearing lubricating system for a vertical shaft electric rotary machine. The arrangement illustrated comprises a vertical axis electric rotary machine generally designated by the reference numeral 10 and including a stator 12, a rotor 14 and a pair of lower and upper shafts 16 and 18 respectively centrally extending in the opposite directions from the rotor 14 to be vertically aligned with each other on the longitudinal axis of the electric rotary machine 10. The arrangement comprises further a lower bracket 20 supporting the stator 12 and an upper bracket 22 located above the stator 12 to surround a free end portion of the upper shaft 18. Disposed within the lower bracket 20 is a frange unit 24 formed integrally with the lower shaft 16 to includes a pendent cylindrical portion coaxial with the lower shaft 18 to form an annular space therebetween with an annular lower end rotatably supported by a thrust bearing 26. Also the pendent cylindrical portion of the frange unit 24 has its outer cylindrical surface radially supported on the upper portion by a lower guide bearing 28. Thus the lower shaft 16 is rotatably supported by the thrust and lower guide bearings 26 and 28 respectively.

Then centrifugal pump means generally designated by the reference numeral 30 includes a plurality of force delivery holes 32 radially extending at predetermined equal angular intervals through the cylindrical portion of the frange unit 24 to be substantially perpendicular to the longitudinal axis of the lower shaft 16, and a cylindrical enclosure 34 having an upper frange radially inward extending to be connected to the guide bearing 28 thereby to close the upper end thereof and lower frange radially inward extending to form a narrow annular gap between the same and the adjacent portion of the outer surface of the pendent cylindrical portion of the frange unit 24. Thus the cylindrical enclosure 34 encloses the outlet side of the force delivery holes 32.

As shown in FIG. 1, the thrust bearing 26 and the lower guide bearing 28 are disposed within a lower oil tank 36 including an outer cylindrical wall and an inner cylindrical wall located in the annular space between the lower shaft 16 and the pendent cylindrical portion of the frange unit 24 to be coaxial with the outer cylindrical wall and an annular bottom plate for connecting the lower end of the outer cylindrical wall to that of the inner cylindrical wall. The lower oil tank 36 is provided at the upper end with an upper frange radially inward extending to form an annular gap between the same and the frange unit 24.

As shown in FIG. 1, the cylindrical enclosure 34 includes one part merged into the outer cylindrical wall of the lower oil tank 367 and therefore is of a non-circular cross section.

The lower oil tank 36 is disposed within the lower bracket 20 and has an amount of a lubricating oil 38 collected therein. Also the thrust bearing 26 is shown in FIG. 1 as being fixedly secured to the annular bottom plate of the lower oil tank 36 through an annular support.

On the other hand, the upper shaft 16 is provided on the upper end portion with a collar 40 fixed thereto and radially supported by an upper guide bearing 42 for rotation. Then an upper oil tank 44 is fitted into the upper bracket 22 to enclose the upper guide bearing 42. The upper tank 44 is similar in construction to the lower tank 36 and has collected therein an amount of the lubricating oil also designated by the reference numeral 38.

The arrangement as described above or the vertical shaft electric rotary machine is equipped on a foundation 40 shown in FIG. 1 as being in the form of an inverted T-shaped longitudinal section. More specifically, the arrangement is fixedly secured to the raised portion of the foundation 40. Then an external oil cooler 42 is disposed on the land portion of the foundation 40 adjacent to the raised portion thereof.

The oil cooler 42 is connected on the upper end portion to the interior of the cylindrical enclosure 34 through a delivery oil pipe 44 and on the lower portion to the lower oil tank 36 through a return oil pipe 46. Then a cooling coil 48 is disposed within the oil cooler 42 and connected at both ends to a supply and an exhaust water pipe 50 and 52 respectively. The supply and exhaust water pipes 50 and 22 are further connected across an oil cooler 54, in this case, a cooling coil disposed in the upper oil tank 44 through a supply and an exhaust water branch 56 and 58 respectively.

In operation the lubricating oil 38 within the lower tank 36 lubricates the thrust bearing 26 and the lower guide bearing 28 to increase in temperature. The centrifugal pump means 30 is operated to pump the lubricating oil 38 thus increased in temperature to the oil cooler 42 through the force delivery pipe 44. Within the cooler 42 the lubricating oil 38 is cooled with a coolant, in this case, cooling water flowing through the cooling coil 48 via the supply water pipe 50. The cooled lubricating oil 38 is returned back to the lower oil tank 38 through the return oil pipe 46. On the other hand, after having cooled the lubricating oil 38, the cooling water from the cooling coil 48 is exhausted through the exhaust water pipe 52.

Thereafter the process as described above is repeated to continuously lubricate and cool the lubricating oil 38 within the lower tank 38.

Simultaneously the lubricating oil 38 within the upper oil tank 44 lubricates the upper guide bearing 42 to increase in temperature. The lubricating oil 38 thus increased in temperature is cooled with cooling water flowing through the supply water pipe 50, the supply water branch 56, the cooling coil 54, the exhaust water branch 58 and the exhaust water pipe 52.

In conventional bearing lubricating system such as described above, the cooling coil 54 has been required to cool the lubricating oil 28 within the upper oil tank 44. Thus the upper oil tank 44 has inevitably been large-sized. Also it has been required to dispose a piping for supplying cooling water to the cooling coil 54 disposed in the upper oil tank 44. In addition the maintenance of such conventional systems have been troublesome. For example, precaution has been always taken against any leakage of water through the connection of the cooling coil 64 to each of the supply and exhaust water branches 56 and 58 respectively.

The present invention contemplates to eliminate the oil cooler disposed in the upper oil tank as described above by the provision of means for supplying a part of the lubricating oil pumped to and cooled by the external oil cooler to the upper oil tank and returning back lubricating oil increased in temperature due to the cooling of the bearing within the upper oil tank to the lower oil tank.

Figure 2:
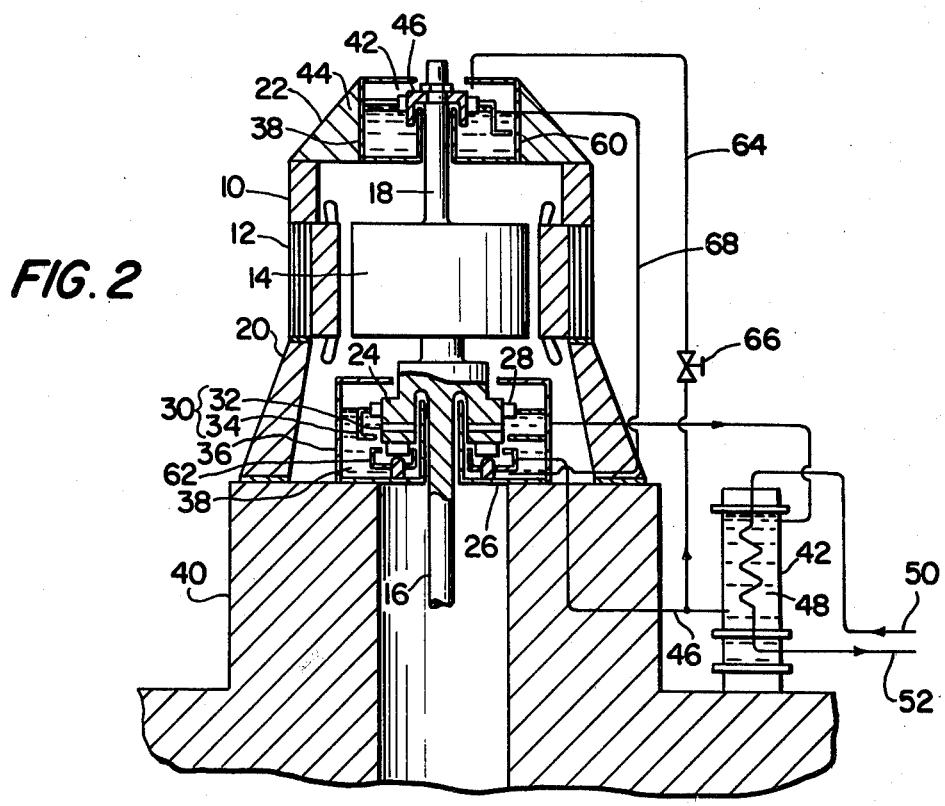
FIG. 2 is a fragmental longitudinal sectional view of one embodiment according to the bearing lubricating system of the present invention for a vertical shaft electric rotary machine with parts illustrated in elevation.

Referring now to FIG. 2 wherein like reference numerals designate the components identical to those shown in FIG. 1, there is illustrated one embodiment according to the bearing lubricating system of the present invention for a vertical shaft electric rotary machine. The arrangement illustrated is identical to that shown in FIG. 1 except for the followings respects: An overflow container 60 is disposed within the upper tank 44 from which the cooling coil 54 has been omitted with the associated water branches 56 and 58, and an annular tub 62 is disposed below the cylindrical enclosure 34 within the lower oil tank 36 so that the thrust bearing 26 is partly entered into the open upper end portion of the annular tub 62.

Then the return oil pipe 46 opens in the annular tub 62 and also a supply oil pipe 64 is branched from the return oil pipe 46 to open in the upper portion of the upper oil tank 44 with a control valve 66 connected in the supply oil pipe 62. Then an overflow oil pipe 68 includes one end opening in the overflow container 60 disposed within the upper oil tank 44 and the other end opening below the bottom of the annular tub 62 within the lower oil tank 36.

As in the arrangement illustrated of FIG. 1, the centrifugal pump means 30 pumps the lubricating oil 38 to the oil cooler 42 through the delivery coil pipe 46 to be cooled after which the cooled lubricating oil is returned back to the lower tank 34, in this case, the annular tub 62 through the return oil pipe 46. Simultaneously, however, the cooled lubricating oil 38 from the oil cooler 672 is partly entered into the branched supply oil pipe 64 and supplied to the upper oil tank 44 due to its oil pressure after its flow rate has been controlled by the control valve 66. Within the upper oil tank 44 the cooled lubricating oil 38 lubricates and cools the upper guide bearing 42 until it increases in temperature. The lubricating oil 38 increased in temperature flows into the overflow container 60 through its upper portion and then downward through the overflow oil pipe 68 until it reaches the lower oil tank 36 on that portion thereof located below the annular tub 62. The lubricating oil 38 from the overflow oil pipe 68 is mixed with that lubricating oil 38 as having lubricated and cooled the thrust and lower guide bearings 26 and 28 respectively. The lubricating oil 38 thus mixed is pumped to the oil cooler 42 through the operation of the centrifugal pump means 30.

Thereafter the process as described above is repeated to lubricate and cool the bearings 26 and 28 within the lower tank 36 and the bearing 42 within the upper tank 44.

From the foregoing it is seen that, according to the present invention, the lubricating oil pumped to the external oil cooler by the centrifugal pump means disposed within the lower oil tank and cooled by the cooler is partly supplied to the bearing in the upper oil tank and the lubricating oil increased in temperature within the upper oil tank is returned back to the lower oil tank. The centrifugal pump means is operated to pump the returned lubricating oil oil to the oil cooler with that having lubricated and cooled the bearings within the lower oil tank after which the process as described above is repeated. Thus the present invention eliminates the necessity of disposing an oil cooler within the upper oil tank resulting in a simplified construction. Also the present invention permits the upper oil tank to be small-sized and eliminates the maintenance and inspection concerning leakages of water.

While the present invention has been illustrated and described in conjunction with a single preferred embodiment thereof it is to be understood that numerous changes and modifications may be resorted to without departing from the spirit and scope of the present invention.

What is claimed is:

1. A bearing lubricating system for a vertical shaft electric rotary machine comprising a rotor, a pair of upper and lower shafts extending in vertically aligned relationship and in the opposite directions from said rotor, upper bearing means for rotatably supporting said upper shaft, lower bearing means for rotatably supporting said lower shaft, an upper oil tank charged with an amount of a lubricating oil and accommodating said upper bearing means therein, a lower oil tank charged with an amount of the lubricating oil and accommodating said lower bearing means therein, centrifugal pump means disposed in said lower oil tank to pump said lubricating oil externally of said lower oil tank, an external oil cooler receiving said lubricating oil externally pumped by said centrifugal pump means to cool said received lubricating oil, first oil piping means for returning said lubricating oil in said oil cooler back to said lower oil tank, and second oil piping means for supplying said lubricating oil in said oil cooler to said upper oil tank and returning said lubricating oil within said upper oil tank to said lower oil tank.

2. A bearing lubricating system for a vertical shaft electric rotary machine as claimed in claim 1 wherein said second oil piping means includes a pipe for supplying to said upper oil tank one part of said lubricating oil returned back to said lower oil tank through said first oil piping means.

3. A bearing lubricating system for a vertical shaft electric rotary machine as claimed in claim 1 wherein said upper oil tank includes an overflow container permitting a portion of said lubricating oil to be overflowed therefrom and said overflowed lubricating oil is arranged to be returned back to said lower oil tank.

4. A bearing lubricating system for a vertical shaft electric rotary machine as claimed in claim 2 wherein a control valve is connected in said pipe to control a flow rate of said lubricating oil supplied to said upper oil tank.

5. A bearing lubricating system for a vertical shaft electric rotary machine as claimed in claim 3 wherein a tub is disposed within said lower oil tank to enclose the lower portion of said lower bearing means and wherein said lubricating oil overflowed to said overflow container within said upper oil tank is returned back to the lower oil tank below said tube through said second piping means.

* * * * *